Dec. 1, 1925.   1,563,546

C. BOUILLON

ELECTRIC MOTOR DRIVEN CHANGE SPEED DEVICE

Filed March 1, 1922    2 Sheets-Sheet 1

Witness
C. F. Nisson

Inventor
Constant Bouillon
By Attorneys

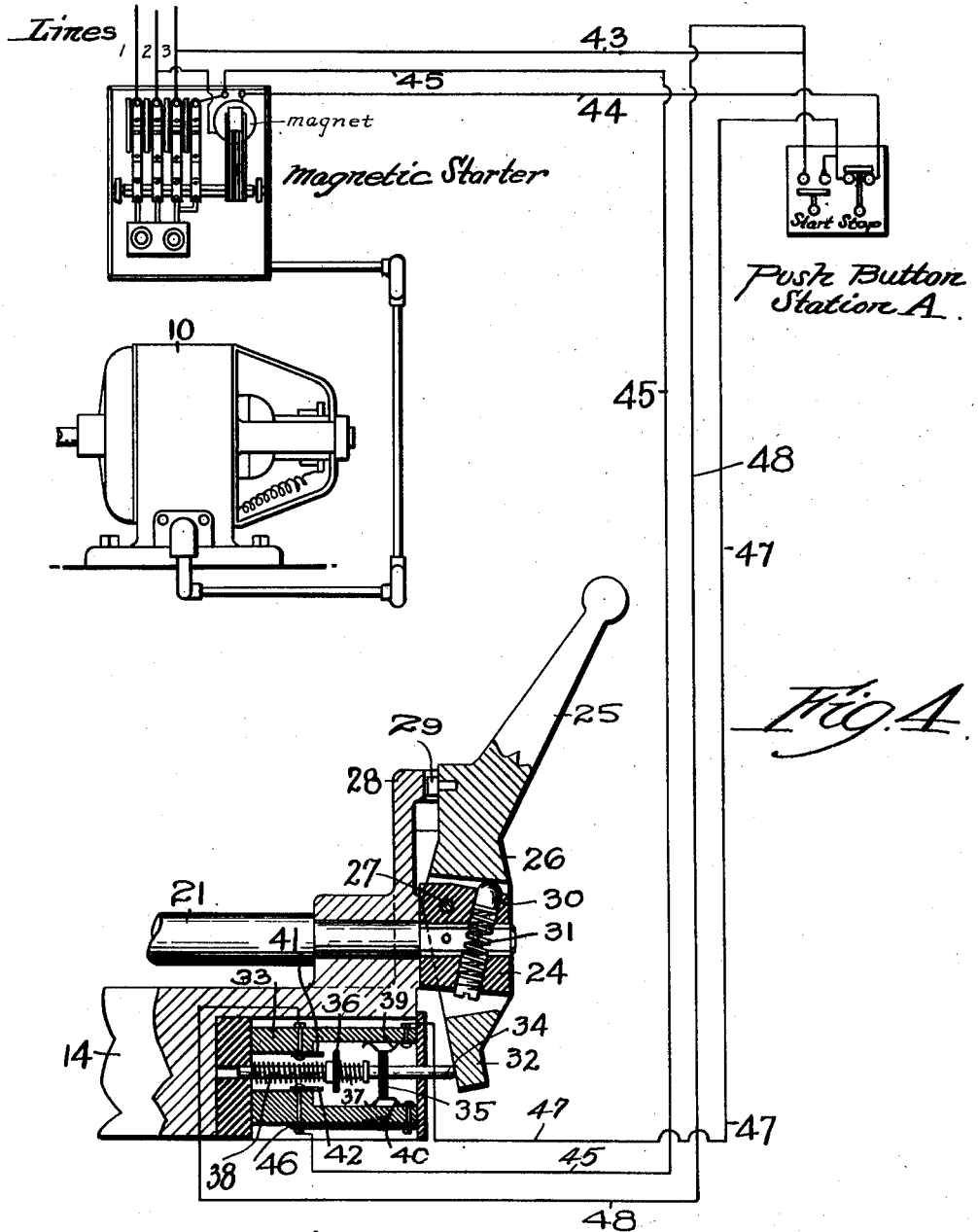

Patented Dec. 1, 1925.

1,563,546

UNITED STATES PATENT OFFICE.

CONSTANT BOUILLON, OF TORRINGTON, CONNECTICUT, ASSIGNOR TO THE HENDEY MACHINE COMPANY, OF TORRINGTON, CONNECTICUT, A CORPORATION OF CONNECTICUT.

ELECTRIC-MOTOR-DRIVEN CHANGE-SPEED DEVICE.

Application filed March 1, 1922. Serial No. 540,342.

*To all whom it may concern:*

Be it known that I, CONSTANT BOUILLON, a citizen of the United States, residing at Torrington, in the county of Litchfield and State of Connecticut, have invented a new and useful Electric-Motor-Driven Change-Speed Device, of which the following is a specification.

The object of this invention is to improve and further extend the electric motor driven change speed device shown, described and claimed in an application for patent filed by me October 15, 1921, Serial No. 507,840.

In said prior application I disclosed an improvement in a change speed device which consisted in combining an electric switch controlling the motor with the operating connections or handle of said device, so that when said connections were operated to change the speed, the switch would be operated to cut out or slow down the motor and so that when the change was effected the switch would return to normal position and the motor to full speed.

In this present application, I have further improved or extended this idea by arranging the mechanism so that it can be used in combination with a motor connected to drive such change speed gearing, which motor is controlled by a magnetic starter and a starting and stopping push button station.

The invention is illustrated in the accompanying two sheets of drawings, referring to which and in detail—

Fig. 4 is a detail or diagrammatic view illustrating the various electrical connections.

Figure 1:
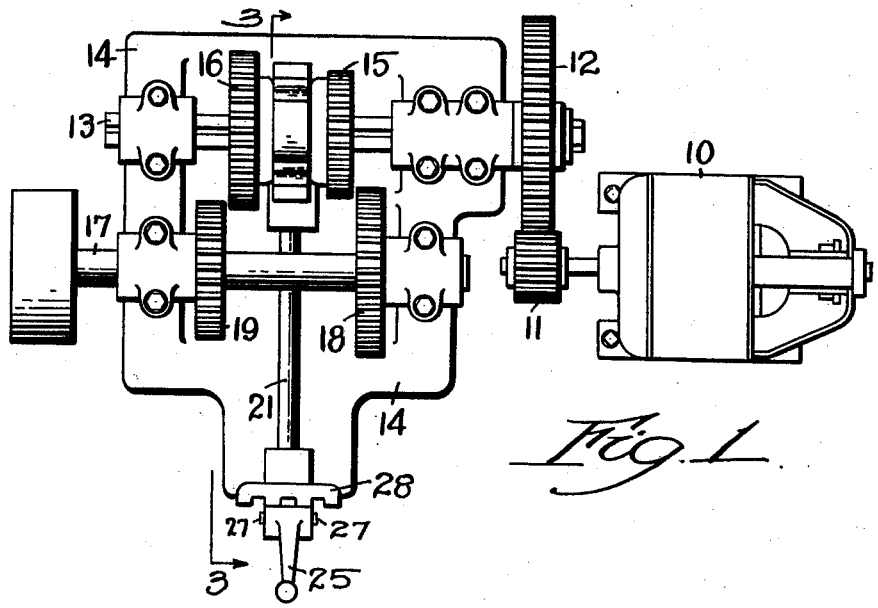
Fig. 1 is a plan view of a change speed device with my improvements applied thereto.
Figure 2:
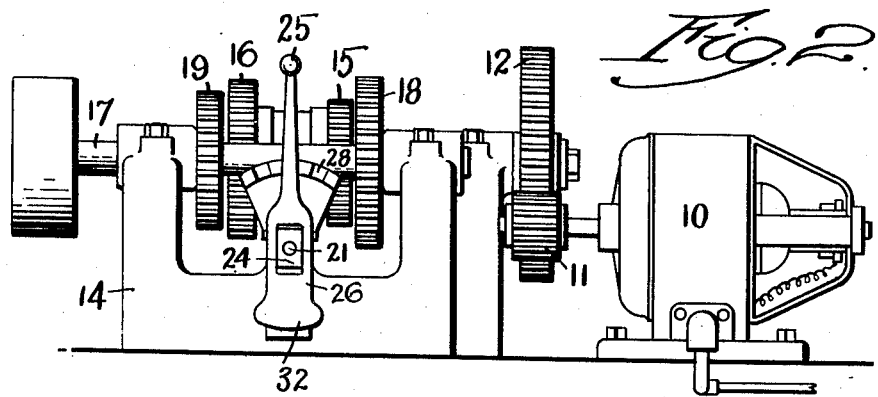
Fig. 2 is a front elevation thereof.
Figure 3:
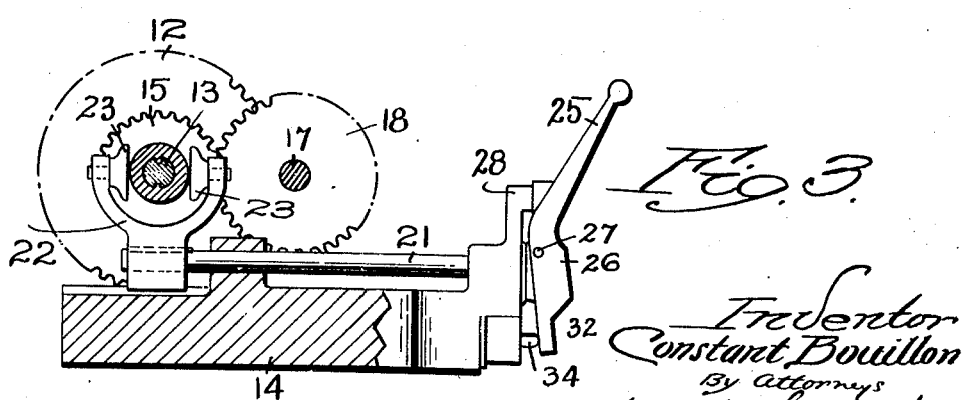
Fig. 3 is a sectional view on the line 3—3 of Fig. 1.

Referring to the drawings and in detail, 10 designates an electric motor which has a driving pinion 11 on its power shaft, which pinion 11 meshes with and drives a gear 12 secured on a shaft 13 journalled in the frame 14 of the change speed device. The shaft 13 is provided with one or more keyways and fitted to slide thereon is a double gear 15—16 which is keyed to said shaft. Another shaft 17 is journalled in brackets on the frame 14 and has gears 18 and 19 secured thereto, and also a pulley which may be used to transmit the power at the various speeds. The above constitutes a simple form of change speed device. When the double gear 15—16 is shifted to the right, power is taken from the shaft 13 through gears 15 and 18 at one speed, and when the double gear is shifted to the left, power is taken through the gears 16 and 19 at an increasing speed.

The operating connections for the change speed device may be arranged as follows: A shaft 21 is journalled in the frame 14 transversely to the shafts 13 and 17 and a yoke 22 is fixed on said shaft 21 having ear pieces 23 engaging the double gear 15—16 so as to move the same on its shaft. A block 24 is keyed and held by a screw on the other end of the shaft 21. An operating handle 25 has a yoke 26 which is fitted on said block 24 and pivoted thereto by screws 27—27. A notched controlling segment or part 28 extends upwardly from one of the bearings of the shaft 21. The operating handle or lever 25 is provided with a part or pin 29 to engage the notches in the segment or part 28. A plunger 30, pushed upwardly by spring 31, is arranged in the block 24 so as to force the operating handle normally inwardly so that its pin 29 will come in one of the notches of the segment 28.

The operating handle or lever 25 has a downwardly extending flange 32 which is set in position to engage the plunger of a combined electric switch and cut out, or double electric switch arranged in the frame of the change speed device below the shaft 21 which will be termed hereinafter the automatic station switch B.

The electric motor 10 is controlled by a magnetic starter of any of the usual types consisting of a magnet, armature and switch as illustrated in the diagram. The leading-in wires are connected to this magnetic starter, three such wires being shown, the motor being driven by a 3-phase alternating current. The automatic station switch B consists of a cylindrical casing 33 of insulating material, sliding in which is a plunger 34, which has a connecting disc 35 rigidly secured thereon, and a connecting disc 36 loosely secured thereon and held in position by springs 37 and 38. The disc 35 works between contacts 39 and 40 and the disc 36 is arranged to engage with contacts 41 and 42 when the plunger 34 is pushed inwardly. A starting and stopping push button station A is connected so the motor can be controlled thereby. Wires 43 and 44 extend from the magnetic starter to the left and right hand contacts respectively of the push button station A. A wire 45 extends from the magnetic starter to the contact 42 of the switch B.

The contacts 40 and 42 of the switch B are connected by a bar 46. A shunt wire 48 extends from the wire 43 to the contact 41.

The push button station A may be of the usual commercial type having a starting button and a stopping button, the stopping button holding down a bar or disc to maintain a normally closed circuit and the starting button holding down a bar or disc to maintain a normally open circuit. When it is desired to start the motor, the starting button is pushed. This causes current to flow through wire 43, all four contacts of the push button station A, through wire 44, energizing the magnet of the magnetic starter throwing in the starting switch and at the same time closing a circuit through wire 45. When the starting button is released, the wire 43 is cut out of circuit but the current continues to flow through wire 44, the stopping button disc or bar, wire 47 to contact 39, disc 35, contact 40, bar 46 of the automatic station B through wire 45 to the starter magnet.

When it is desired to stop the motor, the push stop button is operated momentarily. This breaks the circuit last described. The armature falls away from the magnet, opening the starting switch and cutting off all current from the motor as well as from the magnet.

Now, assume the motor and the change speed gearing to be in operation. If it is desired to shift gears, the handle 25 is pulled to the right to unlock the same from the segment 28. This operation pushes the plunger 34 in thereby moving the discs 35 and 36 to the left. Disc 36 will strike against the contacts 41 and 42 but the plunger can continue its movement to the left as the spring on the right of the disc 36 will be compressed. The continued left hand movement of the plunger 34 will move the disc 35 from between the contacts 39 and 40. This will break the circuit extending through the wire 47 and through the magnet of the magnetic starter and hence will stop the motor or will allow it to drift. Then, the shifting of the gears takes place by moving the handle 25 sideways. This means for insuring the reduced speed or cutting out of the motor during the shifting of the change speed gearing is the chief characteristic of my present invention. As soon as the gears are in their new position, the lever 25 is again pushed in to lock the same in its adjusted position. This will allow the plunger of the automatic switch B to move back to the right to close the circuit again through contact 39, disc 35 and contact 40. This in itself would not start the motor except for the fact that the disc 36 is still in engagement with the contacts 41 and 42 as the disc 35 moves back to the right to engage contacts 39 and 40. When disc 35 is in engagement with 39 and 40 and disc 36 is still pressed against 41 and 42 by the spring, the current flows through wire 43, wire 48, contact 41, disc 36, contact 42, bar 46, contact 40, disc 35, contact 39, wire 47, through station A and wire 44. This energizes the magnet and brings the wire 45 into circuit just as if the starting button of station A had been pushed. The continued motion of the plunger to the right separates disc 36 from contacts 41 and 42, cutting out wires 48 and 43, restoring the parts to condition wherein the motor is in operation.

This cycle of operation at station B can be made at station A as follows: Assume the motor to be running, press in the starting button and keep the same in, closing its circuit. Then press the stopping button which will stop the motor and the motor will remain stopped as long as the stop button is kept in, but as soon as the stop button is released, thereby closing the circuit controlled thereby, the motor starts and the pressure can be removed from the starts button. This is the operation which is obtained at station B through the action of the shifting lever.

Thus, at station A to start the motor all that is necessary is to press the start button and release it and all that is necessary to stop the motor is to press the stop button and release it, this stopping being obtained by breaking circuit 47, 44 and 45 temporarily when the motor stops, not to start again until the starting button is pressed.

At station B the first motion of the shifting lever 25 out of lock closes the circuit between 41 and 42. This does not produce any result but the continued motion of the lever breaks the circuit 44 and 45 and stops the motor. The reverse motion of the lever allows this last circuit again to be closed and as the circuit through 41 and 42 is already closed, the motor starts. When the plunger comes back to normal position the circuit through 41 and 42 is again broken.

Thus, by the arrangements described, the manipulation of the handle 25 to effect a change speed gearing will cause an effect as if the motor were cut out of operation while the change is made and thrown into operation again after the change is effected and still the motor can always be controlled through the push button station and the magnetic starter. The details can be worked out so that the same effects can be obtained with a D. C., a 2-phase A. C. or other current where it is desired to use the same.

The number of working parts required at that when the change is effected, the switch will be operated as if the push button station had been operated to start the motor.

3. A change speed device, operating connections therefor, an electric motor for driving the change speed device, a magnetic starter and push button station for control-